United States Patent [19]

Pass et al.

[11] 3,998,544
[45] Dec. 21, 1976

[54] SYNCHRONOUS AUXILIARY CAMERA PROJECTOR

[75] Inventors: Herman W. Pass; John S. Burton, both of Los Angeles; Ronald L. Whitney, Reseda; Forest L. Langford, Northridge, all of Calif.

[73] Assignee: Terminal Data Corporation, Woodland Hills, Calif.

[22] Filed: June 13, 1975

[21] Appl. No.: 586,687

[52] U.S. Cl. ................................. 355/40; 355/48; 355/54; 355/64

[51] Int. Cl.² ........................................ G03B 27/52

[58] Field of Search .................. 355/40, 47, 48, 53, 355/54, 64, 71, 42

[56] References Cited
UNITED STATES PATENTS 3,485,150  12/1969  Tortorici et al. .............. 354/ 15 X
3,610,121  10/1971  Hanson et al. .................. 355/47 X Primary Examiner—Richard A. Wintercorn
Attorney, Agent, or Firm—Harry R. Lubcke

[57] ABSTRACT

A microfiche is titled by synchronously and incrementally imaging title information having a rotary motion upon the film carrying the microfiche that has a linear motion. Selectable drums carry the title information. Image-forming means transfers this information for the exposure of microfiche film. Equivalent motor means drive both the drum and the microfiche film. Electronic control logic connected to both of the motors accomplishes synchronous motion so that the title information is fixedly impressed with respect to the microfiche film despite the fact that both are in motion.

14 Claims, 4 Drawing Figures

SYNCHRONOUS AUXILIARY CAMERA PROJECTOR

BACKGROUND OF THE INVENTION

This invention pertains to multiple exposure cameras and more particularly to an auxiliary mechano-optical projector arrangement for accomplishing a particular type of exposure.

The multiple exposure microfiche camera is known per se, as exemplified by the patent to J. Burton et al., U.S. Pat. No. 3,601,487.

Various fixed exposure modes of exposing title and equivalent information upon a microfiche film are also known. Therein, such information is merely optically impinged upon the desired area of the microfiche film while it is stationary. The process is similar to that required to accomplish the exposure of a single frame of the microfiche.

The continuously translating flow camera is also known; wherein a belt carrying individual documents is translated in one direction while exposable film within a camera is synchronously translated in the opposite direction, with an imaging lens between. In such cameras a decrease in the size of the image with respect to the size of the document is usual. Thus, a proportional rather than a one-to-one relation of the motions is arranged.

The title on a microfiche is typically across the top of the completed and separated microfiche, occupying a width of the order of one to two centimeters. It may have information that is the same for all of the microfiche of a given series, and also information that is unique for each fiche, as the serial number of the same.

Within the microfiche camera the title is typically positioned along one side of the long roll of fiches. These are later separated after photographic development.

SUMMARY OF THE INVENTION

A modern microfiche camera typically does not have an unobstructed space internally to allow a title for each fiche to be exposed as a whole upon the stationary film.

Thus, a moving film method of exposure of the title must be used.

The invention provides plural selectively useable drums for carrying the desired title in ordinary printing or typing upon paper or an equivalent; the paper strip being replaceable at will.

This title information is illuminated and focused upon the microfiche film in the main camera by a lens system having a one-to-one magnification.

The means to translate the microfiche film is typically a stepper motor. An equivalent stepper motor is used to rotate the drum.

An electronic logic and drive circuit originates drive pulses to drive both motors.

The two devices include damping means such as to cause the two drives to be strictly synchronous. This is required to obtain necessary clarity of the photographed title information. It is not required that each drive be uniform as a function of time, in the strict sense, but each drive must be the same as a function of motion in space.

By separate stationary illumination means unique title information, such as the number of the particular fiche, may also be exposed upon the microfiche film.

DESCRIPTION OF THE PREFERRED EMBODIMENTS

Figure 1:
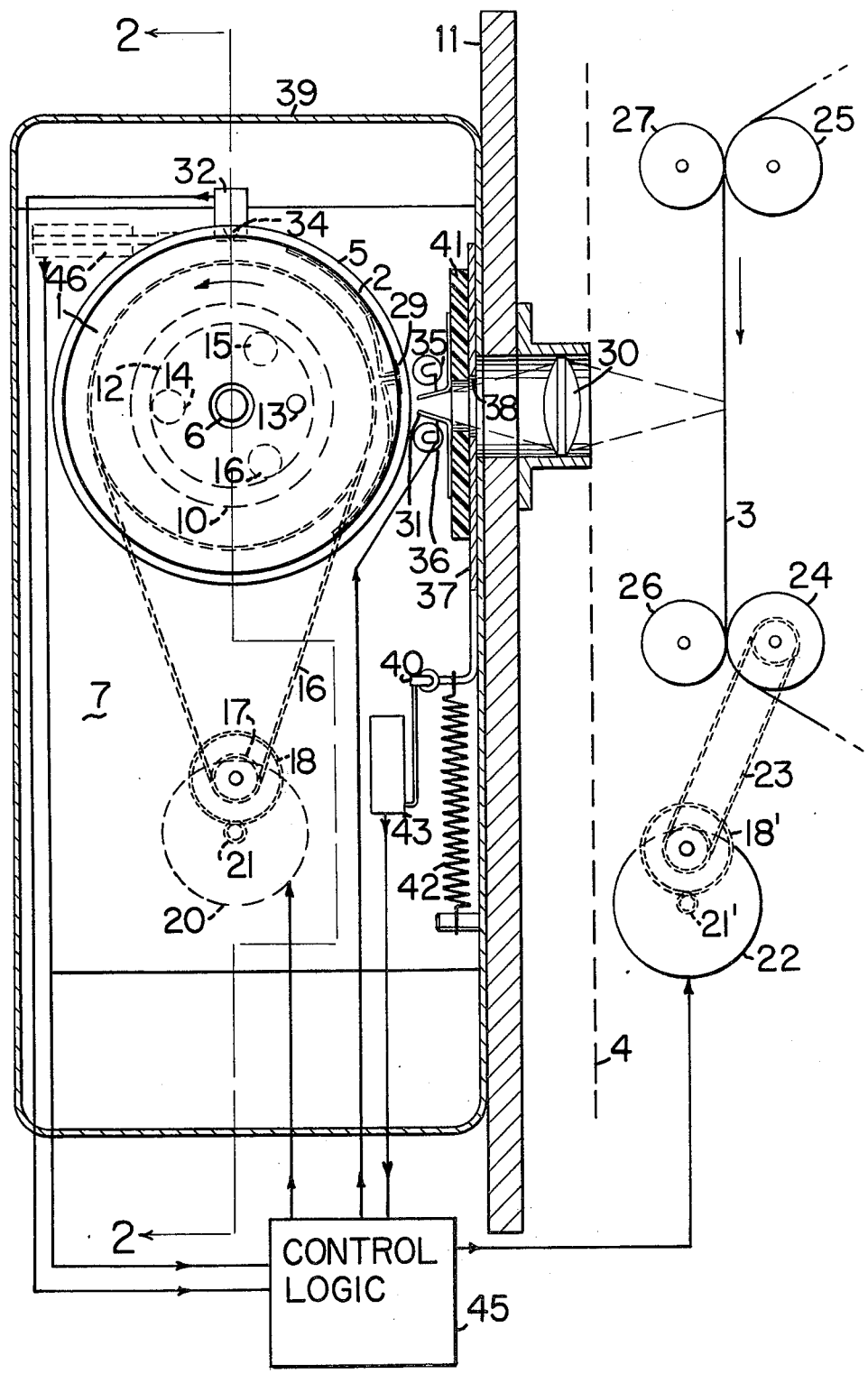
FIG. 1 is a side elevation of the auxiliary imaging attachment and a schematic representation of the coactive portion of the main camera.

In FIG. 1 numeral 1 indicates the drum that carries a title strip 2, sought to be exposed upon a particular microfiche, or upon a series of microfiche. Such fiches are presently in the form of unexposed or partially exposed roll of film 3 within the main microfiche camera, which is schematically shown by the elements to the right of dotted line 4. Elements to the left of line 4 are parts of the auxiliary projector unit. It is easily understood that the usual enclosing cases are provided for both the microfiche camera and the auxiliary projector, each having supports for the several elements. Adapter plate 11 is convenient for attaching the auxiliary to main camera 4.

Drum 1 is typically formed with a rear flange 5 having a greater diameter than the cylindrical portion that receives paper strip 2. The flange is a convenient alignment stop for insuring that strip 2 occupies a uniform axial position on the drum around the circumference thereof.

A stationary shaft 6 is mounted on a rear plate 7, which plate forms the essential frame of the attachment. Plural bearings, 8, 9, such as ball-bearings, are supported by shaft 6 and rotatively carry hub 10.

The forward inner part of the hub is relieved and makes a concentric fit with disk 12 that is attached to the disk-like portion of drum 1. Hub 10 carries pin 13, which engages a corresponding hole in disk 12. This serves to fix the circumferential position of each drum that is mounted upon the hub, and also to drive the drum.

The pointed end of shaft 6 acts as a quick guide means for manually entering the drum upon the hub, but a slight clearance of the central hole in the drum allows a concentric fit to be established between the disk of the drum and the relieved part of the hub.

The drive member, or hub, 10 is provided with magnetic means, such as a plurality of bar permanent magnets 14, 15, 16; which may be of the Alneco type. These magnets attract disk 12, which is ferromagnetic, as soft steel, and so the drum and hub are firmly attached until manual manipulation separates the two when desired. Any number of drums may be provided, each one having different titling information in typical use.

Hub 10 is attached to a gear pulley to accept toothed belt 16. Smaller gear pulley 17 is attached to gear 18. Stepper motor 20 has pinion 21 meshing with gear 18, thus constituting a gear reduction unit identical to that of 18′, 21′, of main camera stepper motor 22. These each have a gear reduction ratio of the order of 6 to 1. Belt 16 in the attachment provides a further reduction of eight to one. Toothed belt 23 drives roller 24 in the main camera. Drive roller 24 is so dimensioned that the linear motion of film 3 when driven by motor 22 is strictly the same as the peripheral motion of the title strip 2 upon drum 1.

A pair of back-to-back spring clips 29 are located radially outward from pin 13. These clips are used to uniquely fasten each end of the title paper strip with respect to the circumference of drum 1. In this way the synchronous motion of the title strip and film 3 is indexed so that the title is centered upon the fiche intended. The spring clips serve as the start point on the title strip.

Suitable means to illuminate the title strip where an image thereof is taken by lens 30 are positioned adjacent to that area. These may take the form of small incandescent lamps of "fuse" shape 35 and 36, or the equivalent.

Lens 30 is physically a part of the auxiliary projector device. It is of suitable photographic quality and has a focal length of the order of 22 mm in a typical embodiment. It is disposed half way between drum 1 and film 3 so that a one-to-one relation of image to object size is obtained. Slit aperture 31 allows only a horizontal slice of the title information 2 to be exposed at any one time; about 2.5 mm.

The film drive in the main camera may be according to the previously mentioned U.S. Pat. No. 3,601,487. Specifically, stepper motor 22 is identical or similar to stepper motor 20, so that the mechanoelectrical characteristics will be equivalent and perfect synchronism between the movement of film 3 and the rotation of drum 1 is obtained. A toothed belt 23 connects a gear belt pulley on the motor gear drive with a companion pulley on film drive roller 24. An additional roller 25 is located at the upper extremity of the exposure zone of the main camera to provide a film path as further detailed in U.S. Pat. No. 3,601,487.

It has been found that commercially obtainable toothed belts and gear pulleys for the same, along with rollers 24 and 25 in combination with pressure rollers 26 and 27, are suitable to drive both drum 1 and film 3 in synchronism and give very good photographic quality to the microfiche title.

In use, a "title command" to start the two systems is provided by main camera logic to be described later. By means of photoelectric or equivalent sensor means and logic control, drum 1 is circumferentially positioned as shown, so that the title thereon is also at one extremity at the lighted position in front of lens 30.

Figure 2:
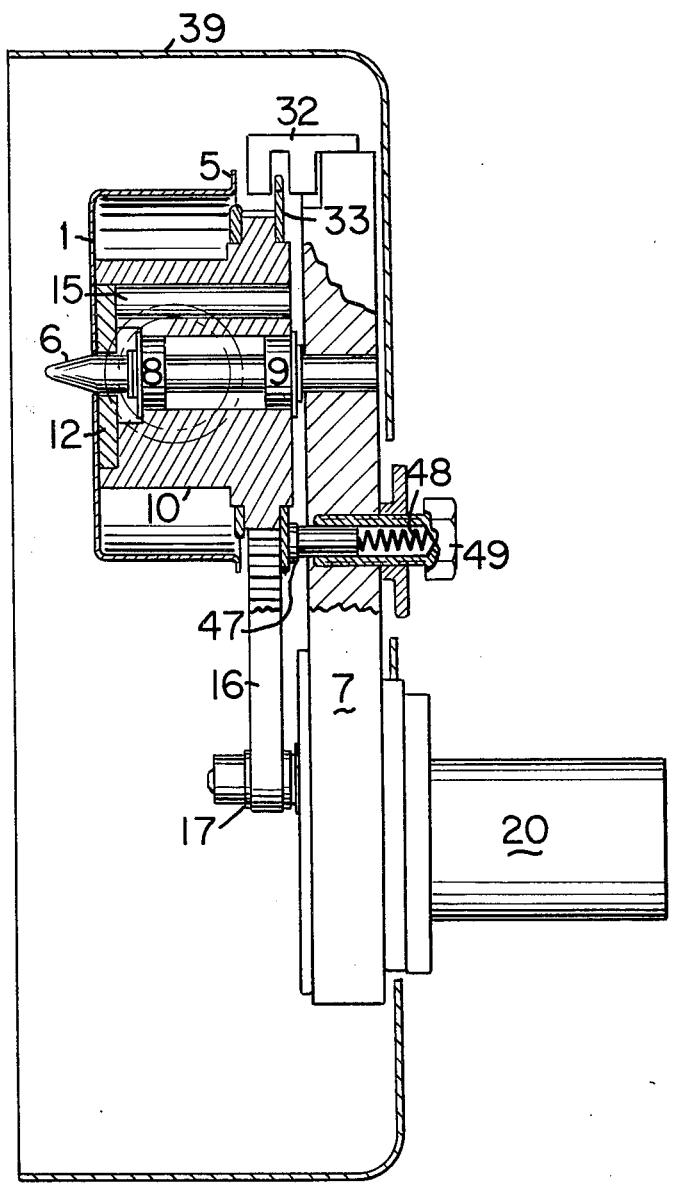
FIG. 2 is a cut-away end elevation of the attachment, along lines 2—2 in FIG. 1.
Figure 3:
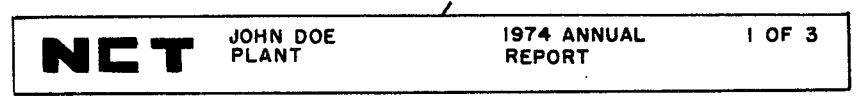
FIG. 3 is a typical strip carrying the desired title for the microfiche, suited to be wrapped around the titler drum.

For example, photoelectric sensor 32 is positioned straddling pulley flange 33 at a convenient circumferential position, such as at the top shown. See FIGS. 1 and 2. This may be a known sensor, such as the General Electric model having a light-emitting diode on one side of the flange and a photo-diode on the other, in an inverted "U" shape for the device.

Notch 34 is provided in flange 33 at that circumferential location that will remove the opaque flange from between the the light-emitting and the light-sensing parts of the sensor when the drum is at the "home" position. That is, when the clips 29 are just above the optical system of lens 30, as opposite lamp 35, and the beginning of title strip 2 is imaged by the optical system.

Sensor 32 is connected to logic block 45, as shown in FIG. 1, which controls camera 4 and the auxiliary projector unit, giving a signal that is interpreted as signifying that drum 1 is in the correct position for the start of rotation thereof for the exposure of the title thereon onto film 3.

Drum 1 is rotated in the direction of the arrow shown; i.e., upward past the optical system, while film 3 in the main camera translates downward according to the arrow shown adjacent to that film. These opposite directions are required to take into consideration the inversion of top to bottom that takes place through the effective single optical element lens system 30. Of course, the directions of motions may be both reversed. Also, if a non-inverting optical system is substituted for lens 30 the two directions of motion may be the same.

A further element on the auxiliary projector unit is capping shutter 37. This is typically an opaque dull black blade approximately 1 mm thick, 3 cm wide and 10 cm high; having aperture 38 about 2 cm in diameter. It is used to prevent ambient illumination from entering the main camera and thereby spuriously exposing film 3 therein when a drum 1 is changed in the auxiliary projector unit. The change is accomplished by opening a door, not shown, that fits over the front of enclosing case 39 in FIG. 1.

A latch is provided that fastens the door closed. The latch mechanically interlocks with the shutter at the lower end 40 such that when it is in the latched position the shutter is as shown, with aperture 38 opening the optical path. When the latch is in the unlatched position the shutter occupies a downward position, closing the optical system. This translation occurs in slots in shutter guide 41. Extension spring 42 assists gravity in closing the shutter when the latch is unlatched to open the door. Guide 41 may be an acetal homopolymer, as Delrin.

Figure 4:
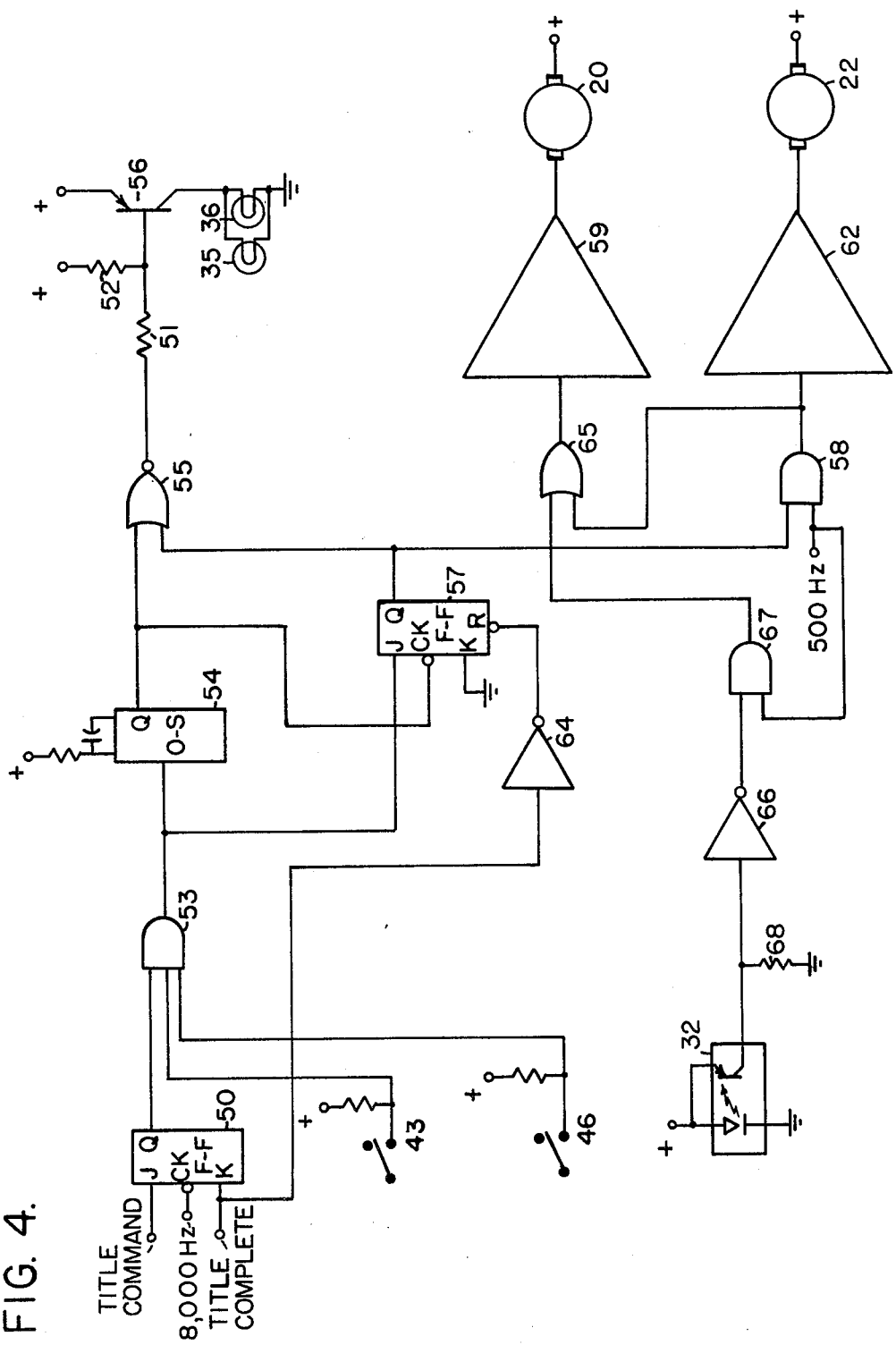
FIG. 4 is the schematic diagram of the logic and drive circuit electronics.

Switching means 43, such as the known Microswitch, is mechanically related to lower end 40 of the shutter to present an electrical open circuit when the door is closed and the latch is latched, for electrical control according to the logic of FIG. 4.

Further sensors are employed to inform the logic of block 45 of the conditions of the auxiliary projector unit; allowing or not allowing it to start functioning should such a command be given by an operator pressing a "title command" push-button.

"Drum present" sensor 46 is positioned to go open circuit when a drum 1 is in place upon hub 10. It would be futile to operate the auxiliary unit if the operator had neglected to place a title drum into it. This sensor may also be the known light-pressure operating switch, as the Microswitch. It is positioned so that rim 5 bears upon the operating plunger of the switch and causes it to remain open as long as the drum is in place, either stationary or rotating. This switch is also electrically connected as an input to block 45.

In the main camera, film 3 acts as a damping mechanical load upon stepper motor 22. It is important that an equivalent damping load be provided for stepper motor 20, so that strict motional synchronism between the two is maintained.

Accordingly, a spring-loaded pressure pad 47 is provided to bear against the rear surface of hub 10. This pad has an adjustable tension device, comprised of compression spring 48 and hollow bolt 49. By adjusting the bolt the pressure can be altered to give the required mechanical damping to the auxiliary projector system.

In a typical embodiment the increment of motion of film 3 and drum 1 is ¼ mm per step of stepping motors 20 and 22. Due to the mechanical inertia of both systems the motion of the optically significant elements does not stop at the end of each step, but continues on.

The speed varies incrementally, but the width of aperture 31 is sufficient to obtain an average mean exposure despite this variation in motional speed of the film.

The photographic exposure is controlled by varying the brightness of lamps 35 and 36. This is accomplished by an analog output from logic 45.

FIG. 4 is the schematic diagram of the logic and drive circuits represented in FIG. 1 as block 45.

In FIG. 4 when a "title command" signal is received at the J input of flip-flop 50 the auxiliary camera projector is energized if certain conditions set forth below are met. This signal typically comes from a main system controller logic, not shown, associated with main camera 4, and is usually manually instigated.

In response to the above input flip-flop 50 is switched to the set state, forcing the Q output thereof high; i.e., as to plus 5 volts. If door switch 43 is in the open circuit condition, signifying that the door is closed and latched, and drum present switch 46 is also open, signifying that a titling drum is present, the output of AND gate 53 is forced high. This high output is applied to the input of one-shot 54, causing it to trigger and forcing its Q output high. The duration of this high output is controlled by the resistor and capacitor values shown connected to the one-shot. A duration of the order of 100 milliseconds is preferred.

The high output of one-shot 54 is applied to one input of NOR gate 55, causing the output thereof to switch to the low state, as approximately one-half volt.

The logic elements recited may be embodied in integrated circuits, such as those manufactured by the Texas Instruments Corp; with a type SN7473 for flip-flop 50, type SN7411 for AND gate 53, type SN74122 for one-shot 54, and type SN7433 for NOR gate 55.

The low output of NOR gate 55 is applied to transistor 56 via resistor 51, typically 470 ohms, over resistor 52, typically 10,000 ohms. One terminal of the latter resistor is connected to a source of positive potential, such as of 5 volts magnitude, d.c..

Transistor 56 is thereby turned on, forcing the collector thereof to plus 5 volts. This forces current through lamps 35 and 36, which illuminate the title strip as has been mentioned previously. The transistor may be a type 2N4403.

One-shot 54 is used to enable the lamps to reach full briliancy, prior to allowing title drum 1 to move. This insures an even photographic exposure of the title on film 3.

The input to one-shot 54 is connected to the J input of flip-flop 57, a SN7473, while the output of one-shot 54 is connected to the clock input of flip-flop 57. The falling edge of the waveform from one-shot 54 at the clock input to flip-flop 57 causes it to switch to the set state, forcing the Q output thereof high. This high output maintains 5 volts on the lamps 35, 36 via transistor 56, which is controlled through NOR gate 55 and resistor 51. This maintains the titling illumination.

The high output of flip-flop 57 is applied to one input of AND gate 58, a SN7408, thereby enabling this gate. The other input is from a source of 500 hertz clock pulses, also from the main controller logic, not shown. When enabled, gate 58 passes the clock pulses, which are then applied to motor amplifier 59, which may be a Computer Devices type M43010 device. This causes drum motor 20 to rotate, thus drum 1. These clock pulses are also applied to motor amplifier 62, which may be the same type as amplifier 59. This causes film pull-down motor 22 to operate, translating film 3.

In this manner the title is imaged onto the film. At the conclusion thereof the main controller logic, not shown, initiates a "title complete" signal. This signal is applied to the K input of flip-flop 50, resetting it, and forcing the Q output low, to approximately one-half volt.

This "title complete" signal is also impressed upon inverter 64, a SN7404, and is applied to the R, reset, input of flip-flop 57. This forces the Q output thereof to the low state, and turns off lamps 35 and 36, via NOR gate 55. Also, via gate 58, the clock pulses to the motor amplifiers are inhibited, and so the motors stop.

An example of main controller logic, not shown herein, is given in the Burton et al. U.S. Pat. No. 3,601,487 previously referred to.

To insure that the titling strip 2 will always start in the correct position, logic is utilized to rotate the drum to its home position. Should the operator install a drum incorrectly, not at the home position, the output of home position sensor 32 is forced low, as 0.5 volts. This low level signal is applied over resistor 68, of 390 ohms, to inverter 66, which forces its output high, as plus 3 volts. This output is applied to AND gate 67, enabling that gate. Thus, the 500 hertz clock pulses that are applied to the second input of gate 67 appear at the output thereof. This output is applied to one input of OR gate 65, which applies the 500 hertz clock pulses to motor amplifier 59; causing the drum to rotate. When drum 1 reaches home position the output of that sensor 32 is forced high. This high value is inverted by gate 66, forcing its output low, inhibiting AND gate 67, thus inhibiting the 500 hertz clock pulses to the motor amplifier and stopping the motor.

Rotation of drum motor 20 for desired titling is accomplished through AND gate 58, as has previously been explained. The output from gate 58 passes through OR gate 65 to enter motor amplifier 59.

Flip-flop 50 is provided with clock pulses for actuation, also from the main controller logic. These enter at the CK terminal of flip-flop 50, and may have a repetition rate of the order of 8,000 hertz.

The several metal parts, such as 7, 10, 11 and 39, may be fabricated of an aluminum alloy, such as 6061T6.

We claim:
1. The method of exposing title information upon a microfiche film, which includes the steps of;
   a. exposing frames over an area of one microfiche group,
   b. linearly translating said microfiche film (3) a distance related to the extent of one microfiche group,
   c. simultaneously rotatively displaying title information (2), and
   d. simultaneously incrementally exposing said microfiche film by an image of said title information which moves synchronously with the translation of said microfiche film.

2. An auxiliary optical projector for exposing title information (2) upon microfiche film (3) in a main camera, comprising;
   a. means within said main camera to longitudinally and transversely drive said microfiche film (3) to form a microfiche,
   b. a rotatable drum (1) to carry title information (2) upon the periphery thereof,
   c. means to form an image (30, 35, 36) of said title information upon said microfiche film, d. means to rotate (16, 17, 18, 20, 21) said rotatable drum, and e. control means (45), connected to the means to longitudinally drive said microfiche film, and to said means to rotate said rotatable drum, to synchronously drive both said means, whereby said title information is incrementally linearly exposed upon said microfiche film.

3. The auxiliary projector of claim 2, which additionally includes;

a. a rotatable hub (10) carrying magnetic means (14, 15, 16), and b. a disk (12) upon said rotatable drum (1), to mechanically position said drum upon said hub and to magnetically removably retain it there.

4. The auxiliary projector of claim 3, in which;

a. said magnetic means comprises a plurality of permanent magnets (14, 15, 16), and b. said disk (12) is ferromagnetic.

5. The auxiliary projector of claim 3, which additionally includes;

a. a stationary shaft (6) carrying bearings (8, 9) to rotatively support said hub (10).

6. The auxiliary projector of claim 2, in which said means to longitudinally drive said microfiche film and said means to rotate said rotatable drum each include;

a. a stepper motor of substantially equivalent electrical and mechanical characteristics.

7. The auxiliary projector of claim 2, in which said means to form an image includes;

a. plural sources of illumination (35, 36) disposed to illuminate a portion of said title information, b. a slit aperture (31) defining an optical path from the illuminated portion of said title information, and c. a lens (30) spaced from said slit aperture along said optical path to image an increment of the illuminated said title information upon said microfiche film.

8. The auxiliary projector of claim 2, which additionally includes;

a. a shutter (37) positioned in the path of said means to form an image (30, 35, 36), and b. means to move said shutter to obscure said path when said auxiliary projector is open to ambient light, and to move said shutter out of said path when said auxiliary projector is closed to ambient light.

9. The auxiliary projector of claim 2, which additionally includes;

a. friction means (47), disposed to affect the rotation of said rotatable drum, whereby the motional damping thereof may be made equivalent to that of said means to longitudinally drive said microfiche film.

10. The auxiliary projector of claim 2 in which said control means (45) includes;

a. status of the auxiliary projector inhibitory means (53, 43, 46), b. motion energizing delay means (54) connected thereto, c. illumination control means (55, 56, 57) connected thereto, and d. motor drive means (58, 59, 62) connected to said delay means.

11. The auxiliary projector of claim 10 in which said inhibitory means includes;

a. plural sensor means (43, 46, 32) responsive to the status of the mechanism of the auxiliary projector, and b. an AND gate connected thereto to require a specific status for transmission of a signal to actuate the mechanism of said auxiliary projector.

12. The auxiliary projector of claim 10 in which said delay means includes;

a. a one-shot logic element (54) having a delay period sufficiently long to insure full illumination of said title information.

13. The auxiliary projector of claim 10 in which said illumination control means includes;

a. current regulating means (56) connected to said illumination means (35, 36), b. a relaxation element (57) to terminate illumination by said illumination means, and c. gate means (55) to transmit the output of said relaxation element to said current regulating means for the control thereof.

14. The auxiliary projector of claim 10 in which said motor drive means includes;

a. gate means (58) for controlling motor-energizing pulses, and b. plural amplifying means (59, 62) connected to said gate means and to motors actuating said main camera (4) and said auxiliary projector drum (1) for the synchronous operation thereof.

* * * * *